Oct. 13, 1942.     A. A. HENDRICKSON     2,298,561
BACTERIA CULTURE AND PRODUCTION THEREOF
Filed Jan. 24, 1940

INVENTOR
ADOLPH A. HENDRICKSON
BY
ATTORNEY

Patented Oct. 13, 1942

2,298,561

UNITED STATES PATENT OFFICE 2,298,561

BACTERIA CULTURE AND PRODUCTION THEREOF

Adolph A. Hendrickson, Oak Park, Ill., assignor to The Albert Dickinson Company, Chicago, Ill., a corporation of Illinois Application January 24, 1940, Serial No. 315,387

8 Claims. (Cl. 195—96)

This invention pertains to the production of bacteria cultures and more particularly to the commercial production of aerobic nitrogen-fixing bacteria of the genus known as Rhizobium.

Rhizobium, of which there are a number of species, are soil bacteria which play an important role in the growth of leguminous plants and soil enrichment. These bacteria when flourishing in the soil in which legumes are grown infect the roots of the plants, forming nodules on the roots, and they cause these plants to derive nitrogen from the atmosphere, with the effect of promoting plant growth, development, and crop yield in a marked degree, while at the same time conserving the nitrogen content of the soil. So important is the function of these root nodule bacteria that it is now commonly recognized to be highly desirable to introduce into the soil in which alfalfa, clover, peas, soybeans or other leguminous crop is to be grown the proper root nodule bacteria for the particular crop. Such bacteria are introduced into the soil by seed inoculation, either by moistening the seed to be sown with water infested with the bacteria, or by mixing the seed with humus or other carrier which has previously been thoroughly infested with such bacteria.

The present invention is not concerned with the commercial handling, transportation and/or distribution of bacteria cultures, but has for its principal object the production on a commercial scale of Rhizobium cultures.

Another object of the invention is to provide a means for producing a much greater quantity of bacteria in the liquid medium, which comprises growing the bacteria in the presence of metals which are non-oligodynamic, such as stainless steel, commercial forms of which are known as Monel metal, Iconel metal, Allegheny chrome, etc.

Figure 1:
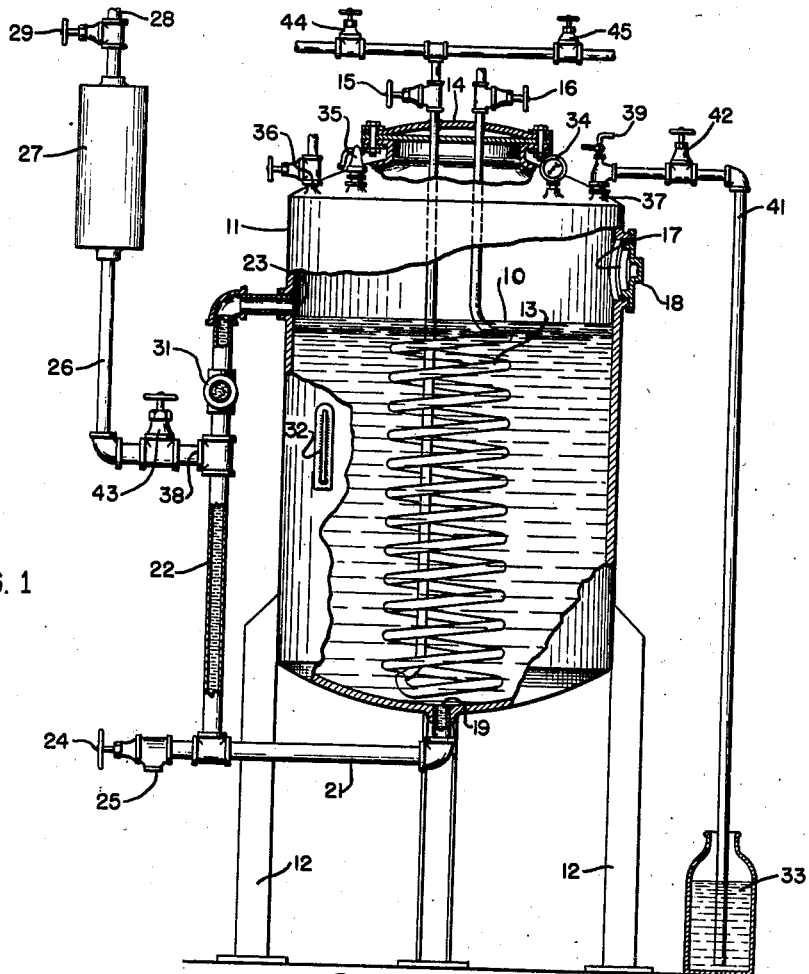
Figure 2:
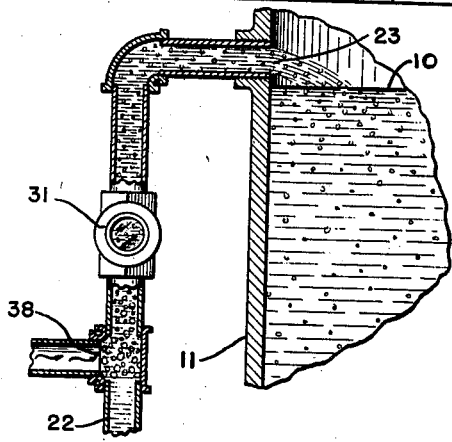

A better understanding of this invention may be had from the following description taken in conjunction with the accompanying drawing, wherein;

Fig. 1 illustrates schematically a form of apparatus for practicing the present invention; and Fig. 2 is a fragmentary sectional view illustrating schematically the action of the pneumatic booster according to the present invention.

Referring to the drawing, a communicating tube apparatus, comprising a tank or vat 11 and a communicating tube or conduit 21—22 is supported on legs 12 and is provided with various openings for purposes hereinafter described. A large opening is provided at the top of the tank for the admission of a coiled pipe or conduit 13 which is dependently supported by a cover 14 which is adapted to be sealed airtight to the tank 11. A seal is also provided between the pipe or tubing constituting the coil 13 and the cover 14 by means of welding or brazing. Appropriate valves 15 and 16 are also provided in the ends of the coil 13 above the cover 14 to control, during the process of sterilization, the flow of steam or water, as the case may be, to heat or cool the interior of the tank 11. For example, in the embodiment shown, the steam supply may be controlled by valve 44, and the cold water supply may be controlled by valve 45. A second large opening 17 is provided in the side of the tank 11 near the top thereof to serve as a handhole or aperture through which access may be gained for the several purposes of cleaning the interior of the tank, preparing the food medium, etc. A cover or plug 18 serves to close the opening 17, which in the embodiment shown is threaded to receive the plug 18, a suitable gasket being employed to provide a suitable airtight seal.

An orifice 19 is provided at the bottom of the tank 11 which orifice leads into a conduit 21 secured to the tank. Connected to conduit 21 is a conduit 22 which extends from conduit 21 to an orifice 23 in the side of tank 11 located at a point just below the level of opening 17, which point, as will hereinafter appear, is just above and adjacent to the surface of the liquid contents of the tank. Conduit 21 extends beyond conduit 22 and terminates in a valve 24 which controls a drain 25. Opening into conduit 22 preferably just above the median point thereof is a conduit 26 which is also connected to an air filter 27, preferably of the cotton air filter type. Filter 27 is connected to a source of compressed air through a conduit 28 which is provided with a control valve 29. Suitably fitted into conduit 22 and located just above the entrance 38 of conduit 26 into conduit 22 is a sight glass 31.

Mounted in the side of tank 11 and located substantially midway between opening 23 and the bottom of the tank 11 is an angle thermometer 32 which projects inwardly into the tank 11 and is sensitive to heat or temperature changes therein. Mounted in the top of tank 11 are a pressure gauge 34 and a safety valve 35 of well known design. There is also provided in the top of tank 11 a valve-regulated inlet 36 through which water may be admitted into the tank. A further opening 37 is provided in the top of tank 11 which serves the dual purpose of providing a means for admitting the inoculating fluid or medium into the tank containing the food medium, as well as providing a connection between the tank 11 and a water seal 33. Immediately above and adjacent the opening 37 is a petcock 39 to which the spout or tubing of the receptacle containing the inoculating fluid is attached. In the conduit 41 connecting the tank 11 with the water seal 33 is a valve 42 for regulating the escape of air from the tank, as will hereinafter appear.

*General operation*

Preparatory to the operation of the hereinbefore described apparatus for the large scale production of Rhizobium cultures, the apparatus is thoroughly cleansed. Valves 24 and 43 are closed and water (preferably filtered or distilled) is admitted into the tank or receptacle 11 through valve opening 36 until the height of the water in tank 11 is at a level substantially ¼ inch below opening 23. The food medium 10 for the growth of the bacteria is then prepared by admitting the various other ingredients constituting the food medium through opening 17. A food medium of the following formula is preferably employed. However, variations of this medium is made to meet the different food requirements of the various species of the genus Rhizobium:

| | | |
|---|---|---|
| Distilled or filtered water | liters | 400 |
| Dipotassium phosphate | grams | 80 |
| Sodium chloride | do | 40 |
| Magnesium sulphate | do | 80 |
| Calcium carbonate | do | 400 |
| Mannitol or sucrose | do | 4,000 |
| Yeast water | liters | 12 |

The food medium is adjusted to a reaction of pH 7.0 to 7.20. Although the general opinion prevails that a slightly acid food medium should be used, it has been found that equally good, if not better, results are obtained by starting with a food medium which is neutral or slightly alkaline, (pH 7.0–7.2). Slight alkalinity is desirable because during the period of culture propagation of some of the species of the genus Rhizobium which produce acid by-products, a tendency toward the acid side results, which compensates for the initial condition of alkalinity; thus the acidity of the culture medium will not become too marked.

When a food medium of proper composition is attained, it is ready for sterilization. The opening which is covered by cover 14 is tightly secured to tank 11 by means of bolts and nuts and a gasket, so that the opening is sealed airtight. This opening remains closed at all times except when necessary repairs are needed on the interior of the tank 11. The opening 17 is closed by handhole cover 18 which is tightly secured so that it is air-tight. The process of sterilization is begun by closing valves 24, 36, 43. Valves 39 and 42 are open and the water seal 33 is removed. Valves 44, 15 and 16 are opened (valve 45 being closed) and causing steam to flow through the coil 13 to raise the temperature inside the tank 11. The air above the food medium in tank 11 escapes through opening 37 and conduit 41 as the temperature and pressure increases inside tank 11. When steam starts to escape through conduit 41, valve 39 is closed and valve 42 is throttled down so that only a small amount of steam escapes through conduit 41. When the steam pressure reaches about 10 pounds as indicated on pressure gauge 34, valve 42 is tightly closed, and water seal 33 placed in position. The pressure then increases in tank 11 until a pressure of 20 pounds is reached or indicated by pressure gauge 34. The temperature reading on thermometer 32 is then maintained at 250 degrees Fahrenheit for about one and three-fourths hours. The temperature is regulated by valve 15. When the process of sterilization is complete valves 15 and 16 are closed and the contents of tank 11 are allowed to cool.

A separate cylinder packed tightly with sterile cotton is used as an air filter to remove contamination from the air which is utilized to carry out the objects of the present invention. This cylinder is sterilized independently in an autoclave under ordinary approved bacteriological procedure and is ready for use whenever desired. This properly sterilized air filter 27 is attached aseptically to valve 43 which has been properly sterilized by chemical means or flaming with a gas flame. Air filter 27 is attached to the air supply 28 by means of a union connection with valve 29. The air supply is at a pressure of about 80 pounds pressure per square inch. However, the air supply source does not necessarily have to be maintained at such a high pressure. As soon as the pressure in tank 11 has become lowered to zero pressure as indicated by pressure gauge 34 then sterile air is allowed to enter tank 11 in the following manner:

First valve 29 is opened, then valve 43 is opened and the air enters tank 11 through opening 23, the air then builds up a pressure in tank 11. When the air pressure in tank 11 is about 2 pounds as indicated on pressure gauge 34, valve 42 is opened and the air then passes through conduit 41, through the water seal 33 and escapes to the atmosphere. The air is allowed to enter the tank 11 to facilitate the cooling of the food medium since, as will presently appear, the air entering the tank 11 causes the mass of food medium to circulate and, therefore, it cools more rapidly. When the contents of tank 11 reaches a temperature of about 210 degrees cold water is allowed to run through coil 13 by closing valve 44, and opening valves 45, 15 and 16 and is permitted to continue until the contents of tank 11 reaches a temperature of 70–85 degrees Fahrenheit at which time valves 45, 15 and 16 are closed. The food medium is ready to be inoculated when the temperature of the contents of tank 11 has reached a temperature of 75–80 degrees Fahrenheit and is accomplished in the following manner:

First valve 42 is closed, then valve 43 and finally valve 29 are closed sequentially. The petcock 39 is then sterilized by applying heat to it, as from a gas flame, sufficient in intensity to insure sterilization. A container or receptacle containing approximately 250 c. c. of a heavy suspension of the mother culture of Rhizobia is connected aseptically to the petcock 39 and the bacteria in this manner is introduced into the tank, thus inoculating the food medium.

After the food medium is thus inoculated, the petcock 39 is closed (the valve 42 having during this procedure been closed) to prevent any unfiltered air from being admitted into the tank. Again valve 29 is opened, then valve 43 is opened; thus sterile filtered air is again admitted to the tank 11 through opening 23. Air pressure is built up inside tank 11 and when it reaches a pressure of 2 pounds per square inch as indicated by gauge 34, valve 42 is opened and the air passes through conduit 41 and water seal 33 into the atmosphere. The water seal 33 prevents any unfiltered air from entering tank 11 from the atmosphere through conduit 41.

As previously described, the height of the liquid contents or food medium in the tank 11 reaches a point slightly below the opening 23, and of course, due to the condition of fluid equilibrium prevailing in the tank or vat and its communicating tube or conduit, the height of the food medium in the conduit 22 is at the same level as that in the tank (as indicated in Fig. 1). The sterile filtered air entering tank 11 through opening 23 is under pressure, as previously described. The admission of the air is regulated by the valve 29 so that the liquid food medium in conduit 22 above the valve 43 is actually lifted or boosted, thus disturbing or overcoming the aforementioned condition of fluid equilibrium and raising the level of the liquid in the conduit 22 and causing a vacuum in the conduit 22 immediately below the opening 38. The air pressure in tank 11 which is at atmospheric pressure acts to force the liquid medium below opening 38 up into the conduit 22, which liquid is constantly acted upon or boosted by the controlled flow of air from conduit 26. Thus, as illustrated in Fig. 2, the liquid medium is caused to be lifted or boosted in conduit 22 and pours out into tank 11 through the opening 23 and in this manner a circulation of the food medium is created, this circulation being in a clockwise direction as viewed in Fig. 2. There is a positive aeration of all the food medium because all of it must pass a certain point, namely, inlet 38. The rate of circulation or the amount of food medium circulated can be regulated as desired by regulating the amount of air that enters conduit 26 or by the size of the diameter of conduit 22. As an example, in the design of tank illustrated where the conduit 22 is 1¼ inches in diameter, the air flow is regulated so it lifts, boosts or circulates the entire contents of the tank 11 or approximately 400 liters of medium in about 20 minutes.

As previously alluded to, the flow of air through valve 43 is controlled so as to obtain the correct boosting effect or action upon the medium in conduit 22, and this effect can be observed through the sight glass 31, which is best located immediately above the valve 43 or more accurately, the entrance of conduit 38 into conduit 22. The admission of air into the food medium at this point has a dual effect. Besides acting to boost the liquid in the conduit 22 and thereby cause a circulation of the liquid food medium, the injected air acts or operates to aerate the food medium. This aeration of the food medium is very essential to the propagation and growth of the bacteria, and as can be viewed through the sight glass 31 (and as has been proven as well by actually observing the liquid on occasion through the handhole opening 17 to determine the thoroughness of the process of aeration) the liquid becomes permeated with tiny air bubbles (as indicated schematically in Fig. 2), thus insuring the constant supply of fresh air and the thorough and complete aeration of the food medium. The use of a liquid food medium is highly desirable for the reason that such a medium greatly enhances or promotes the growth and propagation of the bacteria, and assures complete aeration of the liquid.

As the liquid medium is thus circulated and aerated simultaneously, the growth of the bacteria is promoted, and the concentration of the bacteria in the medium increases gradually. The process of simultaneous circulation and aeration continues for about a week or two weeks, depending upon the species of Rhizobium grown, and the gradual change in the turbidity of the food medium can be observed through the sight glass 31; for example, at the beginning of the operation aforedescribed, the liquid food medium becomes opalescent in appearance and gradually becomes milky in color and consistency. During this process or change in the turbidity of the medium, the air pressure is regulated at 43 and is gradually increased to maintain the proper circulation by controlling the boosting effect of the air. The air pressure created in the upper part of the inside of the tank 11 above the liquid medium is controlled by valve 42, which, as previously mentioned, controls the escape of air. The water seal 33 is provided to insure the exclusion of unfiltered air from inside the tank 11. When the proper turbidity of the medium is attained, the valves 43 and 29 are closed, thus arresting the circulation of the medium. The bacterial culture which is now in a healthy and virile state is drawn off through opening 25 into suitable containers for distribution. The culture may be mixed with a suitable carrier such as peat humus and conveyed to the market in cans or other suitable receptacles.

A much greater quantity of bacteria in the liquid medium is produced in the presence of metals which are nonoligodynamic, such, for example, as stainless steel; commercial forms of which are known as Monel metal, Iconel metal, Allegheny chrome, Allegheny metal, etc. Therefore, in the preferred embodiment of the present invention, all metallic parts whose surfaces come in contact with the food medium are of any of such, or other, varieties of stainless steel. In other words, in the practice of the present invention, it is highly desirable to provide all culture-contacting surfaces with a metal that aids and enhances bacterial growth, that is to say, which is non-oligodynamic; instead of oligodynamic metals, such as copper or silver, which are actively germicidal, and hence inhibit bacterial growth. Moreover, experimentation has conclusively proved that bacterial growth is promoted by the immersion of a bar of metal having non-oligodynamic properties, such as stainless steel, in a glass test tube containing Rhizobium cultures in a liquid food medium. The promotive action of such metals is beneficial to the growth of bacteria of the genus Rhizobium, and hence its utilization in the commercial production of Rhizobium cultures according to the present invention.

Although the present invention has been disclosed in connection with certain specific embodiments thereof, it is understood that such embodiments are merely illustrative and not restrictive, and that all forms coming within the scope of equivalency of the appended claims are intended to be covered by the invention.

What is claimed is:

1. The method of breeding bacteria, which comprises inoculating a liquid food medium, in the presence of stainless steel, with aerobic nitrogen-fixing bacteria of the genus Rhizobium, and aerating the liquid medium by injecting air thereinto in proper direction to cause movement of the mass of said medium whereby aeration of the entire mass is assured and bacterial growth is enhanced by the promotive action of said stainless steel.

2. A unitary structure for the production of

Rhizobium cultures, comprising a closed receptacle having a communicating tube operably associated therewith, pneumatic boosting means connected in the communicating tube to effectuate the simultaneous aeration and circulation of a contents in said receptacle, and means to introduce a mother culture of bacteria into said receptacle, characterized in this that the culture-contacting surfaces of said structure are composed of stainless steel, whereby bacterial growth is promoted.

3. Means for facilitating the effectuation of the sequential steps in the mass production of Rhizobium cultures, comprising a unitary structure having stainless steel culture-contacting surfaces, said structure including a closed receptacle, a communicating tube, pneumatic boosting means including a filter connected to a source of air under pressure, said means connected to the communicating tube above the median point thereof and effective to simultaneously aerate and circulate the contents of said apparatus, a coiled conduit pendantly supported within said apparatus and extending to substantially the bottom thereof, said conduit selectively associated through control valves to sources of steam and cold water to effectuate successively sterilization and subsequent temperature control inside said receptacle, valve means to introduce a mother culture into said receptacle without contamination, a thermometer fixed in the wall of said receptacle and projecting thereinto to determine temperature changes therein, pressure responsive and control means associated with said receptacle, and a sight glass introduced in said communicating tube above and adjacent the interconnection of said boosting means and said communicating tube dually effective to enable the control of the effectiveness of said boosting means and to reveal continuously the increase in turbidity of the contents indicative of the gradual concentration of the culture therein enhanced by the promotive action of said stainless steel.

4. Means for facilitating the effectuation of the sequential steps in the mass production of Rhizobium cultures, comprising in a unitary structure, a closed receptacle having stainless steel culture-contacting surfaces, a communicating tube extending from an orifice at the bottom of said receptacle to an orifice in the side thereof located above and adjacent a predetermined contents level, pneumatic boosting means including a filter connected to a source of air under pressure, said means connected to the communicating tube above the median point thereof and effective to simultaneously aerate and circulate the contents of said receptacle, a coiled conduit pendantly supported within said receptacle and extending to substantially the bottom thereof, said conduit selectively associated through control valves to sources of steam and cold water to effectuate successively sterilization and subsequent temperature control inside said receptacle, valve means to introduce a mother culture into said receptacle without contamination, a thermometer fixed in the wall of said receptacle and projecting thereinto to determine temperature changes therein, pressure responsive and control means associated with said receptacle, and a sight glass introduced in said communicating tube above and adjacent to the point of interconnection of said boosting means and said communicating tube dually effective to enable the control of the effectiveness of said boosting means and to reveal continuously the increase in turbidity of the contents indicative of the gradual concentration of the culture therein in the presence of said stainless steel.

5. The method of breeding bacteria in a closed receptacle, which comprises inoculating a liquid food medium with aerobic nitrogen-fixing bacteria of the genus Rhizobium, and aerating the liquid medium by injecting air thereinto in proper direction to cause movement of the mass of said medium whereby aeration of the entire mass is assured, characterized by the fact that the culture-contacting surfaces of said receptacle are composed of stainless steel, whereby bacterial growth is promoted.

6. Means for facilitating the effectuation of the sequential steps in the mass production of Rhizobium cultures, comprising a unitary structure having stainless steel culture-contacting surfaces, said structure including a closed receptacle, valve means to introduce a mother culture of Rhizobia into said receptacle without contamination, a communicating tube, and pneumatic boosting means connected to a source of air under pressure, said boosting means connected to the communicating tube to simultaneously aerate and circulate the contents of said structure, whereby bacterial growth is enhanced by the promotive action of said stainless steel.

7. The method of breeding Rhizobium cultures, which comprises inoculating a liquid food medium, in the presence of stainless steel culture-contacting surfaces, with aerobic nitrogen-fixing bacteria of the genus Rhizobium, and aerating the liquid medium by injecting air thereinto in proper direction to cause movement of the mass of said medium whereby aeration of the entire mass is assured and bacterial growth is enhanced by the promotive action of said stainless steel.

8. The method of breeding Rhizobium cultures, which comprises inoculating a liquid food medium, in the presence of stainless steel culture-contacting surfaces, with aerobic nitrogen-fixing bacteria of the genus Rhizobium, and aerating and circulating the liquid medium by pneumatically boosting said medium in a communicating pathway to cause movement of the mass of said medium whereby aeration of the entire mass is assured and bacterial growth is enhanced by the promotive action of said stainless steel.

ADOLPH A. HENDRICKSON.